United States Patent
Niwa et al.

(10) Patent No.: US 7,633,677 B2
(45) Date of Patent: Dec. 15, 2009

(54) REFLECTIVE SCREEN

(75) Inventors: Masatoshi Niwa, Joetsu (JP); Hajime Maruta, Joetsu (JP); Norimitsu Ebata, Joetsu (JP); Yuji Sawamura, Joetsu (JP); Ken Kikuchi, Tokyo (JP); Tomoya Yano, Tokyo (JP)

(73) Assignees: Arisawa Mfg. Co., Ltd., Niigata (JP); Sony Corporation, Tokyo (JP)

( * ) Notice: Subject to any disclaimer, the term of this patent is extended or adjusted under 35 U.S.C. 154(b) by 651 days.

(21) Appl. No.: 10/582,845

(22) PCT Filed: Dec. 22, 2004

(86) PCT No.: PCT/JP2004/019201

§ 371 (c)(1),
(2), (4) Date: Jun. 14, 2006

(87) PCT Pub. No.: WO2005/064398

PCT Pub. Date: Jul. 14, 2005

(65) Prior Publication Data

US 2007/0146875 A1  Jun. 28, 2007

(30) Foreign Application Priority Data

Dec. 25, 2003 (JP) ............... 2003-430943

(51) Int. Cl.
G03B 21/56 (2006.01)
G03B 21/60 (2006.01)
G02B 5/30 (2006.01)
G02B 27/28 (2006.01)

(52) U.S. Cl. ............... 359/459; 359/449; 359/485

(58) Field of Classification Search ............... 359/449, 359/459, 443, 485
See application file for complete search history.

(56) References Cited

U.S. PATENT DOCUMENTS

| 5,148,309 A | 9/1992 | Yamada et al. |
| 7,515,336 B2 * | 4/2009 | Lippey et al. ............... 359/443 |
| 2003/0137728 A1 | 7/2003 | Kuroda et al. |

FOREIGN PATENT DOCUMENTS

| EP | 766126 A1 * | 4/1997 |
| JP | 04-318829 A | 11/1992 |
| JP | 06-075301 | 3/1994 |
| JP | 06-075302 A | 3/1994 |
| JP | 07-199356 A | 8/1995 |
| JP | 08-328151 A | 12/1996 |
| JP | 09-152658 | 6/1997 |
| JP | 11-133508 A | 5/1999 |
| JP | 2000-221601 A | 8/2000 |
| JP | 2001-228546 A | 8/2001 |
| JP | 2002-107828 A | 4/2002 |
| JP | 2002-122715 A | 4/2002 |
| WO | WO 02/065208 A1 | 8/2002 |

* cited by examiner

*Primary Examiner*—Diane I Lee
*Assistant Examiner*—Magda Cruz
(74) *Attorney, Agent, or Firm*—Sughrue Mion, PLLC

(57) ABSTRACT

A reflective screen that uses an aluminum-foil reflecting layer, wherein speckling can easily be suppressed in the reflective screen. The reflective screen is composed of a surface diffusion layer, a transparent adhesive layer, and an aluminum-foil reflecting layer layered together. A diffusing material is added to the transparent adhesive layer, and a transparent layer having a prescribed thickness is provided between the transparent adhesive layer and the aluminum-foil reflecting layer.

7 Claims, 1 Drawing Sheet

REFLECTIVE SCREEN

TECHNICAL FIELD

The present invention relates to a reflective screen that uses an aluminum foil.

BACKGROUND ART

A reflective screen has been proposed in the past in which a surface diffusion layer is layered on a rolled aluminum-foil reflecting layer via a transparent adhesive layer. This reflective screen is recognized for its improved optical characteristics (resolution) brought about by having minute irregularities (known as hairlines, which naturally form during rolling) on the aluminum foil surface.

DISCLOSURE OF THE INVENTION

Problems the Invention is Intended to Solve

However, when there are too many of these minute hairlines, speckling (glare) can be seen that forms due to interference in the light projected onto the surface of the aluminum foil. This type of speckling sometimes causes discomfort, since the speckling is conspicuous when the screen is viewed in a dimly lit room, or when a white image is projected.

Speckling does not occur when the minute hairlines have an irregularity depth of 200 μm or greater, but the speckling is theoretically more visible when the irregularity depth is 200 μm or less. Actually, the irregularity depth of the hairlines formed during rolling of the aluminum foil is most often 100 μm or less.

Therefore, one possible method of preventing the occurrence of speckling is to make the irregularity depth 200 μm or greater on the aluminum foil surface during manufacturing of the aluminum foil, for example. However, since it is difficult to manage the manufacturing process so that an irregularity depth of 200 μm or greater is obtained in the aluminum foil surface, speckling is difficult to prevent.

An object of the present invention is to provide a reflective screen that uses an aluminum-foil reflecting layer, wherein speckling can be easily suppressed in the reflective screen.

Means For Solving The Above-mentioned Problems

The essence of the present invention will be described with reference to the accompanying drawings.

The present invention relates to a reflective screen comprising a surface diffusion layer 1, a transparent adhesive layer 2, and an aluminum-foil reflecting layer 5 layered together, wherein the reflective screen is characterized in that a diffusing material is added to the transparent adhesive layer 2; and a transparent layer 3 having a thickness of 1 mm or greater that is capable of reducing the resolution of speckling that occurs on the surface of the aluminum foil and causing this reduced-resolution speckling to reach the surface diffusion layer 1 is provided between the transparent adhesive layer 2 and the aluminum-foil reflecting layer 5.

The present invention also relates to the reflective screen according to claim 1, wherein the reflective screen is characterized in that the diffusing material is added in an amount that gives the transparent adhesive layer 2 a haze of 50 to 70.

The present invention also relates to the reflective screen according to claim 1, wherein the reflective screen is characterized in that the thickness of the transparent layer 3 is 1 mm to 3 mm.

The present invention also relates to the reflective screen according to claim 2, wherein the reflective screen is characterized in that the thickness of the transparent layer 3 is 1 mm to 3 mm.

The present invention also relates to the reflective screen according to any one of claims 1 through 4, wherein the reflective screen is characterized in that a polarizing plate 4 is provided between the transparent layer 3 and the aluminum-foil reflecting layer 5.

The present invention also relates to the reflective screen according to claim 5, wherein the reflective screen is characterized in that a transparent adhesive layer 2" to which a diffusing material has not been added is layered on the aluminum-foil reflecting layer 5; a polarizing plate 4 is layered on the transparent adhesive layer 2" to which a diffusing material has not been added; a transparent adhesive layer 2' to which a diffusing material has not been added is layered on this polarizing plate 4; a transparent layer 3 is layered on the transparent adhesive layer 2' to which a diffusing material has not been added; a transparent adhesive layer 2 to which a diffusing material has been added is layered on this transparent layer 3; and a surface diffusion layer 1 is layered on the transparent adhesive layer 2 to which a diffusing material has been added.

The present invention also relates to the reflective screen according to claim 6, wherein the reflective screen is characterized in that each of the layers that include the surface diffusion layer 1, the transparent adhesive layers 2' and 2" to which a diffusing material has not been added, the transparent layer 3, the polarizing plate 4, and the transparent adhesive layer 2 to which a diffusing material has been added has a refractive index of 1.45 to 1.55.

Effect of the Invention

Since a diffusing material is added to the transparent adhesive layer in the present invention, speckling is dispersed and averaged. A transparent layer having a prescribed thickness is also provided between the transparent adhesive layer and the aluminum-foil reflecting layer. Therefore, the speckling that occurs on the aluminum foil surface reaches the surface diffusion layer in a state of decreased resolution (blurred state), and speckling is suppressed.

BEST MODE FOR CARRYING OUT THE INVENTION

Figure 1:
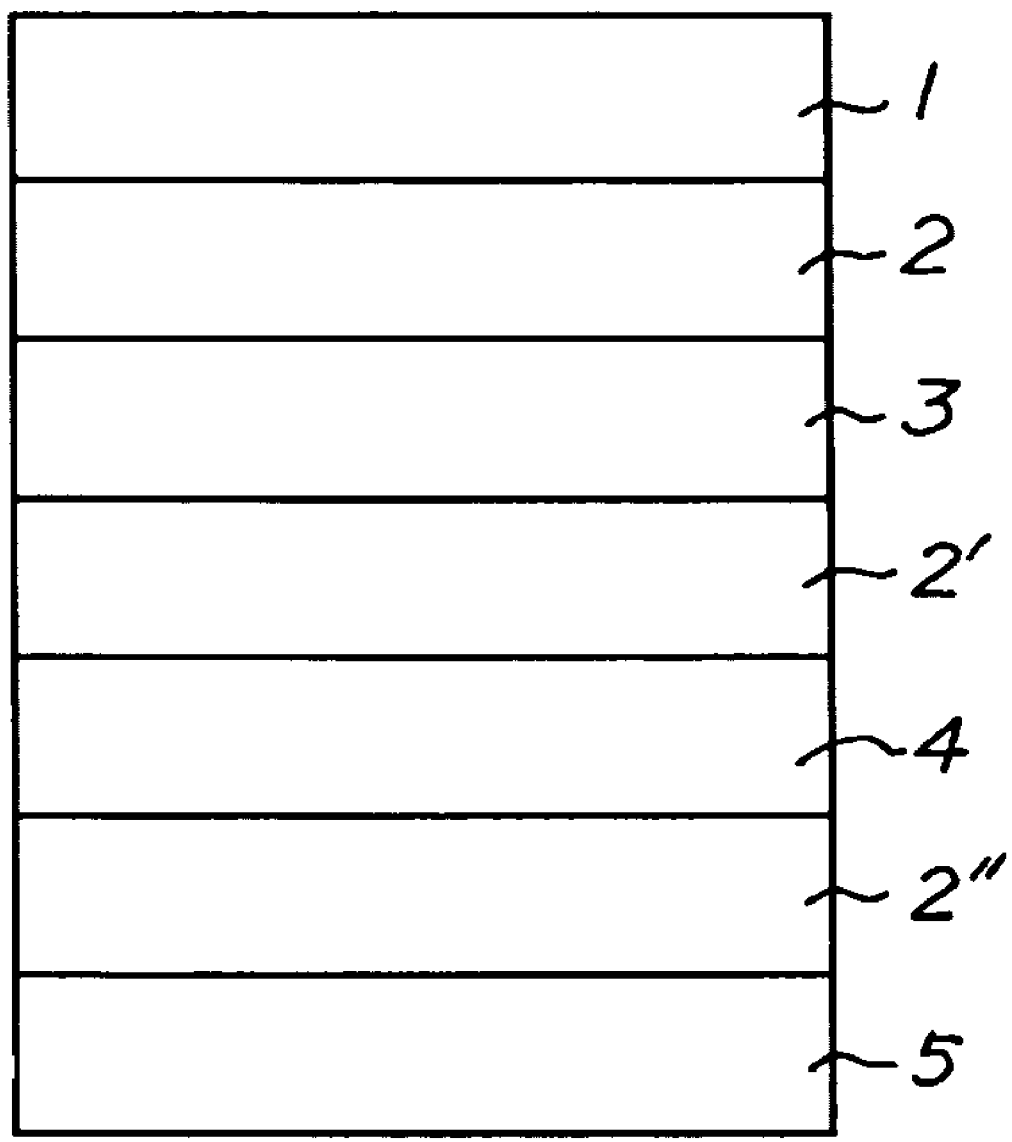
FIG. 1 is a diagram showing the layering state in the present example.

Suitable embodiments of the present invention will be briefly described based on the drawings by way of the operation of the present invention.

In the present invention, the transparent adhesive layer 2 becomes clouded since a diffusing material is added to the transparent adhesive layer 2. For example, speckling that occurs as a result of interference in the projected light is dispersed and averaged.

Furthermore, since a transparent layer 3 having a prescribed thickness is provided between the transparent adhesive layer 2 and the aluminum-foil reflecting layer 5, the aluminum-foil surface layer 5 is separated from the surface diffusion layer 1 by a distance equal to the thickness of the transparent layer 3, and speckling that occurs on the aluminum foil surface reaches the surface diffusion layer 1 slightly out of focus in a state of decreased resolution (blurred state).

In the present invention, there is therefore a commensurate reduction in the visibility of speckling, and a reflective screen is obtained in which speckling can easily be suppressed.

EXAMPLES

Specific examples of the present invention will be described based on the drawings.

The present example is a reflective screen in which a transparent adhesive layer 2″ to which a diffusing material has not been added is layered on the aluminum-foil reflecting layer 5; a polarizing plate 4 is layered on the transparent adhesive layer 2″ to which a diffusing material has not been added; a transparent adhesive layer 2′ to which a diffusing material has not been added is layered on this polarizing plate 4; a transparent layer 3 is layered on the transparent adhesive layer 2′ to which a diffusing material has not been added; a transparent adhesive layer 2 to which a diffusing material has been added is layered on this transparent layer 3; and a surface diffusion layer 1 is layered on the transparent adhesive layer 2 to which a diffusing material has been added.

A resin film is used as the surface diffusion layer 1. Resin films that can be used include TAC (triacetyl cellulose), polypropylene, vinyl chloride, acrylic resin, polycarbonate, and the like. The surface of the resin film is given an anti-glare treatment by embossing, coating, or another process, and the surface is hardened and provided with anti-glare effects. TAC is used in the present example.

A pressure-sensitive acrylic-based adhesive is used for the transparent adhesive layers 2′ and 2″ to which a diffusing material has not been added. Adhesives that can be used include highly transparent acrylic-based adhesives, or urethane-based adhesives, polyester-based adhesives, and the like. The total thickness of the transparent adhesive layers 2′ and 2″ to which a diffusing material has not been added is preferably about 30 μm.

The diffusing material used in the transparent adhesive layer 2 to which a diffusing material has been added is a silicone, styrene, acrylic, or other transparent material that is a transparent spherical or amorphous filler. Spherical silicone beads having an average grain size of 5 μm are used in the present example, and the amount in which the beads are added is adjusted so that the haze of the transparent adhesive layer 2 to which the diffusing material is added is 50 to 70.

It was confirmed by experimentation that a haze of 50 or less in the transparent adhesive layer 2 is not preferred because the dispersion and averaging of the speckling that occurs on the aluminum foil surface are inadequate. It was also confirmed by experimentation that a haze of 70 or higher is not preferred because the optical characteristics are adversely affected (a dark image occurs), and striping and other defects occur in the appearance of the transparent adhesive layer 2 from adding too much of the diffusing material.

A synthetic resin plate is used as the transparent layer 3. This synthetic resin plate may be a transparent plate formed from acrylic resin having transparency equal to or greater than that of optical glass.

The speckling that occurs on the aluminum foil surface is blurred according to the thickness of the transparent layer 3. Providing the transparent layer 3 with a thickness of 1 mm or less is not preferred because there is no blurring effect, and the speckling cannot be suppressed. A thickness of 3 mm or greater is also not preferred because the blurring effect becomes too pronounced, and resolution is reduced. Specifically, the transparent layer 3 preferably has a thickness ranging from 1 mm to 3 mm, and when the transparent layer 3 has a thickness of 1 mm to 3 mm, speckling-prevention effects can be demonstrated with no reduction in resolution.

An iodine-based polarizing plate or a dye-based polarizing plate is used as the polarizing plate 4. Specifically, a polarizing plate is used that has a degree of polarization of 90% or higher. The thickness of the polarizing plate is about 120 μm. An iodine-based polarizing plate having a thickness of 120 μm and a degree of polarization of 95% is used in the present example.

An aluminum foil obtained by rolling an ingot or slab to a thickness of 0.15 mm or less in a rolling mill is used as the aluminum-foil reflecting layer 5. Specifically, a flexible aluminum foil rolled to a thickness of 0.007 mm or less is used.

In the present example, a match is established among the refractive indices of the surface diffusion layer 1, the transparent adhesive layers 2′ and 2″ that do not include the diffusing material, the transparent layer 3, the polarizing plate 4, and the transparent adhesive layer 2 that includes the diffusing material. Specifically, by adjusting the refractive index of each layer to 1.45 to 1.55, the layers are made less prone to cause surface reflection, and speckling between layers is minimized.

A configuration is adopted in the present example whereby a transparent adhesive layer 2″ to which a diffusing material has not been added is layered on the aluminum-foil reflecting layer 5, a polarizing plate 4 is layered on the transparent adhesive layer 2″ to which a diffusing material has not been added, a transparent adhesive layer 2′ to which a diffusing material has not been added is layered on this polarizing plate 4, a transparent layer 3 is layered on the transparent adhesive layer 2′ to which a diffusing material has not been added, a transparent adhesive layer 2 to which a diffusing material has been added is layered on this transparent layer 3, and a surface diffusion layer 1 is layered on the transparent adhesive layer 2 to which a diffusing material has been added, as previously mentioned. However, a configuration may also be employed in which the transparent layer 3 and the polarizing plate 4 are switched; specifically, a configuration may be adopted in which a transparent adhesive layer 2″ to which a diffusing material has not been added is layered on the aluminum-foil reflecting layer 5, a transparent layer 3 is layered on the transparent adhesive layer 2″ to which a diffusing material has not been added, a transparent adhesive layer 2′ to which a diffusing material has not been added is layered on this transparent layer 3, a polarizing plate 4 is layered on the transparent adhesive layer 2′ to which a diffusing material has not been added, a transparent adhesive layer 2 to which a diffusing material has been added is layered on this polarizing plate 4, and a surface diffusion layer 1 is layered on the transparent adhesive layer 2 to which a diffusing material has been added.

A comparative example (conventional example) will be given below to describe the characteristics of the present example.

(1) Experiment 1 and Comparative Experiment 1 are examples of experiments in which the effects of the diffusing material-including layer and the transparent layer are confirmed.

Experiment 1 (with Diffusing Material—Including Layer and Transparent Layer)

A screen was obtained by sequentially layering the aluminum-foil reflecting layer 5 with the transparent adhesive layer 2″ that does not include the diffusing material, the polarizing plate 4, the transparent adhesive layer 2′ that does not include the diffusing material, the transparent layer 3, the transparent adhesive layer 2 (adjusted to a haze of 50 to 70) that includes the diffusing material, and the surface diffusion layer 1.

The screen thus obtained was photographed, producing all-white image light in a dark location, and speckling was visually evaluated (noticeable, somewhat noticeable, not noticeable). The results showed that speckling was not noticeable, and that the screen thus obtained exhibited speckling-suppressing effects.

Comparative Experiment 1 (without Diffusing Material—Including Layer and Transparent Layer)

A screen was obtained by sequentially layering the aluminum-foil reflecting layer 5 with the transparent adhesive layer 2" that does not include the diffusing material, the polarizing plate 4, the transparent adhesive layer 2' that does not include the diffusing material, and the surface diffusion layer 1.

The screen thus obtained had noticeable speckling, and did not have speckling-suppressing effects like those evident in Experiment 1.

It was confirmed from the above results that speckling is noticeable in a screen that does not have the transparent layer 3 and the transparent adhesive layer 2 that includes the diffusing material, whereas speckling is not noticeable in a screen that has the transparent layer 3 and the transparent adhesive layer 2 that includes the diffusing material; that speckling can be prevented in the screen by the transparent layer 3 and the transparent adhesive layer 2 that includes the diffusing material; and that appropriate viewing angle characteristics can also be demonstrated.

(2) Experiment 2 and Comparative Experiment 2 are examples of experiments in which the effects of the thickness of the transparent layer are confirmed.

Experiment 2 (Transparent Layer Thickness of 1 mm)

A screen was obtained by sequentially layering the aluminum-foil reflecting layer 5 with the transparent adhesive layer 2" that does not include the diffusing material, the polarizing plate 4, the transparent adhesive layer 2' that does not include the diffusing material, the transparent layer 3 (thickness of 1 mm), the transparent adhesive layer 2 (adjusted to a haze of 50 to 70) that includes the diffusing material, and the surface diffusion layer 1.

The screen thus obtained was photographed, producing all-white image light in a dark location, and speckling was visually evaluated (noticeable, somewhat noticeable, not noticeable). The results showed that speckling was not noticeable, and that speckling was suppressed in the screen thus obtained.

Comparative Experiment 2 (Transparent Layer Thickness of 0.3 mm)

A screen was obtained by sequentially layering the aluminum-foil reflecting layer 5 with the transparent adhesive layer 2" that does not include the diffusing material, the polarizing plate 4, the transparent adhesive layer 2' that does not include the diffusing material, the transparent layer 3 (thickness of 0.3 mm), the transparent adhesive layer 2 (adjusted to a haze of 50 to 70) that includes the diffusing material, and the surface diffusion layer 1.

Speckling was somewhat noticeable in the resultant screen, and speckling-suppressing effects like those shown in Experiment 2 were not evident.

It was confirmed from the above results that speckling is somewhat noticeable in a screen in which the thickness of the transparent layer 3 is 0.3 mm, whereas speckling is not noticeable in a screen in which the thickness of the transparent layer 3 is 1 mm; that speckling can be prevented in the screen when the transparent layer 3 has a certain thickness; and that appropriate viewing angle characteristics can also be demonstrated.

KEY TO SYMBOLS

1 surface diffusion layer
2 transparent adhesive layer to which diffusing material has been added
2' transparent adhesive layer to which diffusing material has not been added
2" transparent adhesive layer to which diffusing material has not been added
3 transparent layer
4 polarizing plate
5 aluminum-foil reflecting layer

The invention claimed is:

1. A reflective screen comprising a surface diffusion layer, a transparent adhesive layer, and an aluminum-foil reflecting layer layered together; said reflective screen characterized in that a diffusing material is added to said transparent adhesive layer; and a transparent layer having a thickness of 1 mm or greater that is capable of reducing the resolution of speckling that occurs on the surface of the aluminum foil and causing the reduced-resolution speckling to reach the surface diffusion layer is provided between the transparent adhesive layer and the aluminum-foil reflecting layer.

2. The reflective screen according to claim 1; said reflective screen characterized in that the diffusing material is added in an amount that gives the transparent adhesive layer a haze of 50 to 70.

3. The reflective screen according to claim 1; said reflective screen characterized in that the thickness of the transparent layer is 1 mm to 3 mm.

4. The reflective screen according to claim 2; said reflective screen characterized in that the thickness of the transparent layer is 1 mm to 3 mm.

5. The reflective screen according to any one of claims 1 through 4; said reflective screen characterized in that a polarizing plate is provided between the transparent layer and the aluminum-foil reflecting layer.

6. The reflective screen according to claim 5; said reflective screen characterized in that a transparent adhesive layer to which a diffusing material has not been added is layered on this aluminum-foil reflecting layer; a polarizing plate is layered on the transparent adhesive layer to which a diffusing material has not been added; a transparent adhesive layer to which a diffusing material has not been added is layered on this polarizing plate; a transparent layer is layered on the transparent adhesive layer to which a diffusing material has not been added; a transparent adhesive layer to which a diffusing material has been added is layered on this transparent layer; and a surface diffusion layer is layered on the transparent adhesive layer to which a diffusing material has been added.

7. The reflective screen according to claim 6; said reflective screen characterized in that each of the layers that include the surface diffusion layer, the transparent adhesive layer to which a diffusing material has not been added, the transparent layer, the polarizing plate, and the transparent adhesive layer to which a diffusing material has been added has a refractive index of 1.45 to 1.55.

* * * * *